US008319659B2

(12) United States Patent
Buck et al.

(10) Patent No.: US 8,319,659 B2
(45) Date of Patent: Nov. 27, 2012

(54) SENSOR SYSTEM AND METHOD FOR OPERATING A SENSOR SYSTEM

(75) Inventors: Thomas Buck, Tamm (DE); Thorsten Pannek, Stuttgart (DE); Gustav Klett, Moessingen (DE); Marian Keck, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 470 days.

(21) Appl. No.: 12/600,701

(22) PCT Filed: Jul. 10, 2008

(86) PCT No.: PCT/EP2008/058974
§ 371 (c)(1),
(2), (4) Date: Nov. 18, 2009

(87) PCT Pub. No.: WO2009/033847
PCT Pub. Date: Mar. 19, 2009

(65) Prior Publication Data
US 2010/0176969 A1 Jul. 15, 2010

(30) Foreign Application Priority Data
Sep. 10, 2007 (DE) .......................... 10 2007 043 077

(51) Int. Cl.
*G08C 19/00* (2006.01)

(52) U.S. Cl. ........ 340/870.31; 342/27; 342/28; 342/352; 342/360; 342/387; 455/73; 455/226.1; 343/867; 343/879; 343/893

(58) Field of Classification Search ............. 340/870.31; 342/27, 28, 352, 368, 387, 442, 465; 455/73, 455/226.1; 343/867, 879, 893
See application file for complete search history.

(56) References Cited

U.S. PATENT DOCUMENTS

| | | | |
|---|---|---|---|
| 6,580,353 B1 * | 6/2003 | Geber et al. .................. 340/5.61 |
| 7,397,348 B2 * | 7/2008 | Iwazumi et al. .......... 340/426.33 |
| 7,825,868 B2 * | 11/2010 | Sabet et al. .................... 343/767 |
| 8,016,756 B2 * | 9/2011 | Homan et al. ................. 600/302 |
| 2006/0071768 A1 * | 4/2006 | Iwazumi et al. ............... 340/447 |
| 2006/0079190 A1 * | 4/2006 | Ooba et al. ................. 455/226.1 |
| 2007/0120738 A1 * | 5/2007 | Stroud ........................... 342/387 |
| 2008/0062066 A1 * | 3/2008 | Arai .............................. 343/867 |
| 2011/0285571 A1 * | 11/2011 | Jeong et al. ..................... 342/27 |

FOREIGN PATENT DOCUMENTS

| | | |
|---|---|---|
| DE | 102 40 446 | 3/2004 |
| GB | 1505804 | 3/1978 |
| WO | 2005/082645 | 9/2005 |

* cited by examiner

*Primary Examiner* — Lam T Mai
(74) *Attorney, Agent, or Firm* — Kenyon & Kenyon LLP

(57) ABSTRACT

A sensor system having a sensor module and an induction unit is provided, the sensor module having a first antenna, and the induction unit having a second and a third antenna, an induction transmission of signals being provided between the first and the second antenna, and the signals being sent and/or received electromagnetically by the third antenna.

13 Claims, 4 Drawing Sheets

SENSOR SYSTEM AND METHOD FOR OPERATING A SENSOR SYSTEM

FIELD OF THE INVENTION

The present invention relates to a sensor system.

BACKGROUND INFORMATION

A sensor module is discussed, for example, in German patent document DE 102 40 446 A1. The transmission device is integrated into the sensor module and is galvanically coupled to the sensor element. It is disadvantageous in this case that a reliable implementation of an electrically conductive contact between the sensor element and the transmission device, in a comparatively greatly stressful environment, particularly in a tire, and, at the same time, a secure seal of a sensor housing having a contact passage, especially from moisture, are implemented only in a very costly, and with that, cost-intensive manner.

SUMMARY OF THE INVENTION

The sensor system according to the present invention and the method according to the present invention, for operating a sensor system according to the alternative independent claims, have the advantage over the related art that no galvanic coupling is provided between the sensor module and the third antenna for receiving and/or radiating electromagnetic signals. As a result, no mechanically or chemically stressable electrically conductive contact is integrated into the sensor system, and the sensor module is completely enclosed by a closed, compact module housing.

By comparison to the related art, the sensor system according to the present invention is therefore substantially more cost-effective to produce, and at the same time ensures a considerably increased reliability, particularly when it is integrated into a tire, in which both great mechanical stresses of the sensor system occur, due to vibrations, stresses, large acceleration forces, etc., and great chemical stresses due to engine oils, exhaust gases, moisture, etc.

An additional advantage of the exemplary embodiments and/or exemplary methods of the present invention is the integration of the sensor element into the comparatively compact module housing, in spite of the compactness, at the same time a high send and/or receive performance of the sensor system being achieved. This is made possible by the induction unit outside the module housing, which, in particular, at least partially encloses the sensor module, and the signal transmission between the sensor element and the induction unit taking place via a purely inductive transmission between the first and the second antenna.

This purely inductive and comparatively short-range signal transmission enables the implementation of the first and the second antenna having comparatively low dimensions. The inductive signal transmission may be a signal transmission that is based on the generation of a first electric current flow in the first or second antenna, as a function of a change over time of a magnetic flux, the magnetic flux resulting from a change over time of the current strength of a second current flow through the second or the first antenna.

The radiation and/or reception of signals by the third antenna is based particularly on electromagnetic alternating fields, which have a greater range as opposed to inductive signal transmission. The third antenna may be used for communication of the sensor element with a vehicle control system, the scanning and/or the transmission of tire control data may be especially provided.

A further advantage of the exemplary embodiments and/or exemplary methods of the present invention is that the induction unit is able to be premounted in a tire, standardized properties such as impedance and antenna quality may be fixed, so that, depending on requirements, any desired sensor module is optionally able to be integrated into the tire in an additional, later production step. The integration of the transmission unit into the tire may particularly be provided in the production process of the tire by the direct vulcanization of the unit into it.

Advantageous embodiments and refinements of the present invention may be seen in the disclosure herein, including the specification, as well as with reference to the drawings.

According to one refinement, the first antenna includes a wire loop, a wire strap or a circuit-board conductor loop, particularly on a printed-circuit board. Consequently, a particularly efficient induction transmission of the first antenna is advantageously implemented, the wire loops or the circuit-board conductor loops may be provided having a plurality of turns. The direct integration of the first antenna into a printed-circuit board which may be provided may be particularly advantageous, since this enables a cost-effective and simple production of the first antenna in the production process of the printed-circuit board, the printed-circuit board functioning particularly for the interconnection of the sensor element, additional microelectronic components, the first antenna and/or additional passive components.

According to one additional refinement, the second antenna and/or the third antenna includes a wire loop antenna, a helix antenna, a loop antenna and/or a dipole antenna, the second and the third antenna may be developed in one piece and the second and/or the third antenna may especially have a plurality of turns. The development of the second and the third antenna in one piece advantageously makes possible a cost-effective production of same in a single production process. The development of the second antenna as a helix also increases the efficiency of the inductive signal transmission. In particular, the coupling planes of the first and second antenna are provided to be essentially parallel to each other.

According to one additional refinement, the sensor module is situated within the second antenna that is developed as a wire loop or a helix, the efficiency of the induction transmission being further enhanced in an advantageous manner. In addition, this arrangement makes possible a mechanical fixing, that is easy to implement, between the module housing and the induction unit, a complete integration and/or a latching or clamping of the second antenna into the module housing, or adhering the same onto the module housing may be provided. The positioning of the second antenna in an additional housing may also be provided, the additional housing being latched and/or adhered to the module housing.

According to still another refinement, the third antenna has two subsections, the second antenna being situated between the two subsections; and the subsections may be developed as dipole antennas. Consequently, coupling of the signals by the second antenna into the third antenna is advantageously particularly efficient, making possible the integration of the third antenna, developed as a dipole, into a vehicle tire in a simple manner.

According to yet another refinement, the sensor module has passive, microelectronic and/or micromechanical components, which may be at least one tire pressure sensor chip, and the components are situated on the printed-circuit board and/or an additional printed-circuit board. Within the meaning of the present invention, a printed-circuit board includes both flexible and rigid boards and any number of individual circuit-board conductors which are developed as a plate and/or on a plate or plane. In an advantageous manner, the refinement makes implementable a comparatively compact and cost-effectively producible embodiment of the sensor module by the integration of the components and the first antenna on the one printed-circuit board. The merging of a tire pressure sensor chip into the sensor module further makes possible the implementation of the sensor system as a cordless tire pressure sensor.

According to yet another refinement, the coupling planes of the first and the second antenna, which are especially developed as wire loops, are aligned perpendicular to the tire tread and/or a steel belt surface. Advantageously, influences of the steel belt surface on the coupling properties are thus minimized when there is inductive signal transmission between the first and the second antenna.

An additional subject matter of the present invention is a method for operating a sensor system, electric signals, which are generated by at least one of the components, being inductively transmitted via the first antenna to the second antenna and being radiated electromagnetically by the third antenna; and/or electromagnetic signals being received by the third antenna and being inductively transmitted via the second antenna to the first antenna; the corresponding electric signals being conducted by the first antenna to at least one component. Thus, a reliable and secure signal transmission or signal reception and/or a signal radiation by a compact sensor system is advantageously made possible, which is exposed to comparatively great mechanical and/or chemical stresses.

One other subject matter of the present invention is a use of a sensor system according to the present invention in a vehicle tire, which may be in a tire pressure control system. Exemplary embodiments of the present invention are depicted in the drawings and described in greater detail in the description below.

DETAILED DESCRIPTION

Figure 1:
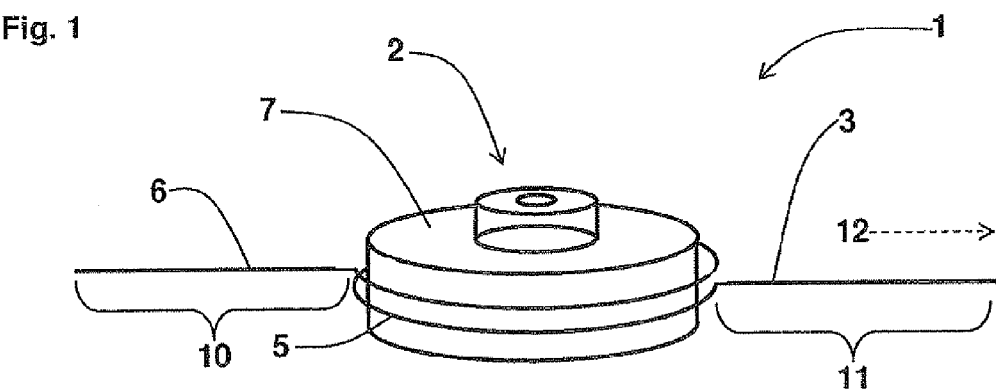
FIG. 1 shows a schematic view in perspective of a sensor system according to a first specific embodiment of the present invention.

In the various figures, the same parts are always assigned the same reference numerals, and they are therefore each named only once, as a rule.

FIG. 1 shows an exemplary schematic view in perspective is shown of a sensor system 1, according to a first specific embodiment of the present invention, sensor system 1 having a sensor module 2 and an induction unit 3; sensor module 2 having a first antenna 4 (not illustrated); and induction unit 3 having a second and a third antenna 5, 6; an induction transmission of signals being provided between first and second antenna 4, 5; and the signals being sent and received electromagnetically by third antenna 6. Sensor module 2 is enclosed by a cylindrical module housing 7 and by an induction unit 3, the second and third antenna 5, 6 being developed as one piece. The second antenna includes a helix shape having one and one-half turns, third antenna 6 having two subsections 10, 11, and second antenna 5 being situated between the two subsections 10, 11, and subsections 10, 11 being developed as dipole antennas parallel to a straight line 12. Sensor module 2 is situated within second antenna 5 that is developed as a helix.

Figure 2:
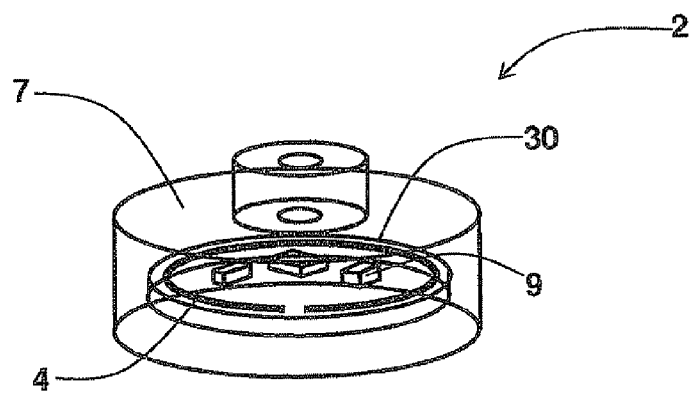
FIG. 2 shows a schematic view in perspective of a sensor module of the sensor system according to the first specific embodiment of the present invention.

FIG. 2 shows an exemplary schematic view in perspective of a sensor module 1, according to the first specific embodiment of the present invention, sensor module 2 having the first antenna 4 which includes at least one circuit-board conductor loop on a printed-circuit board 30. Sensor module 2 also has passive, microelectronic and micromechanical components 9 on printed-circuit board 30, especially a tire pressure sensor chip. The coupling planes of first and second antenna 4, 5 are essentially parallel to each other.

Figure 3:
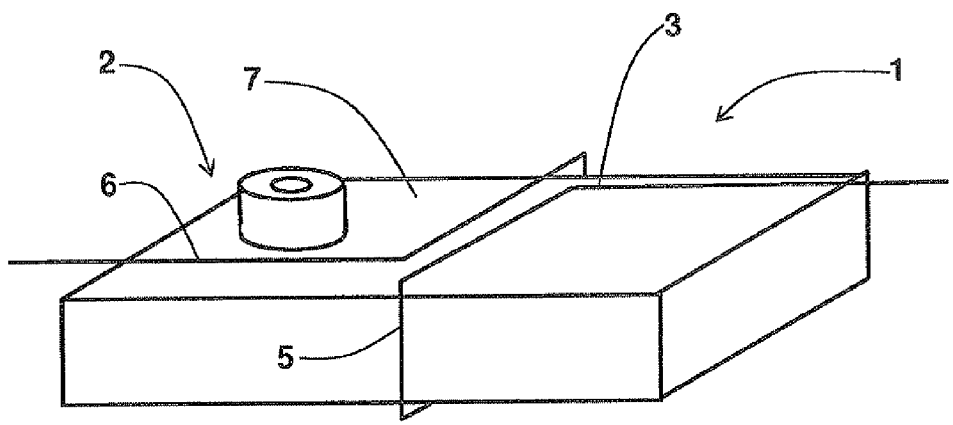
FIG. 3 shows a schematic view in perspective of a sensor system according to a second specific embodiment of the present invention.

FIG. 3 shows an exemplary schematic view in perspective of a sensor system 1, according to a second specific embodiment of the present invention, the second specific embodiment being illustrated in FIG. 1 identical to the first specific embodiment; only the coupling planes of the (not shown) first and (shown) second antenna 4, 5 being aligned perpendicular to a (not shown) steel belt surface 31, and, with that, also being aligned perpendicular to printed-circuit board 30; and second antenna 5 being developed as a rectangular conductor loop having one and one-half turns and module housing 7 being developed as a parallelepiped.

Figure 4:
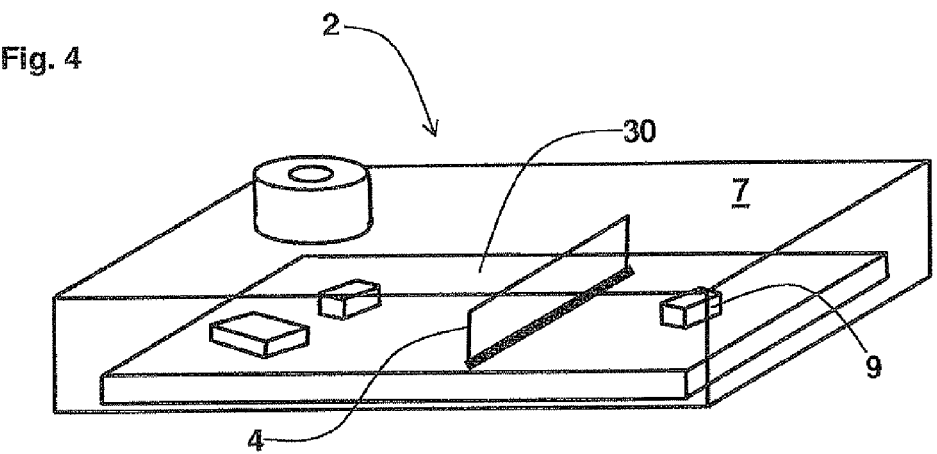
FIG. 4 shows a schematic view in perspective of a sensor module of the sensor system according to the second specific embodiment of the present invention.

FIG. 4 shows a schematic view in perspective of a sensor module 2 of the sensor system 1, according to the second specific embodiment of the present invention, the second specific embodiment being illustrated in FIG. 2 identical to the first specific embodiment; only module housing 7 being shaped like a parallelepiped, printed-circuit board 30 being rectangular and first antenna 4 being developed as a wire strap, the coupling plane of first antenna 4 running perpendicular to printed-circuit board 30 and parallel to second antenna 5 (not shown).

Figure 5:
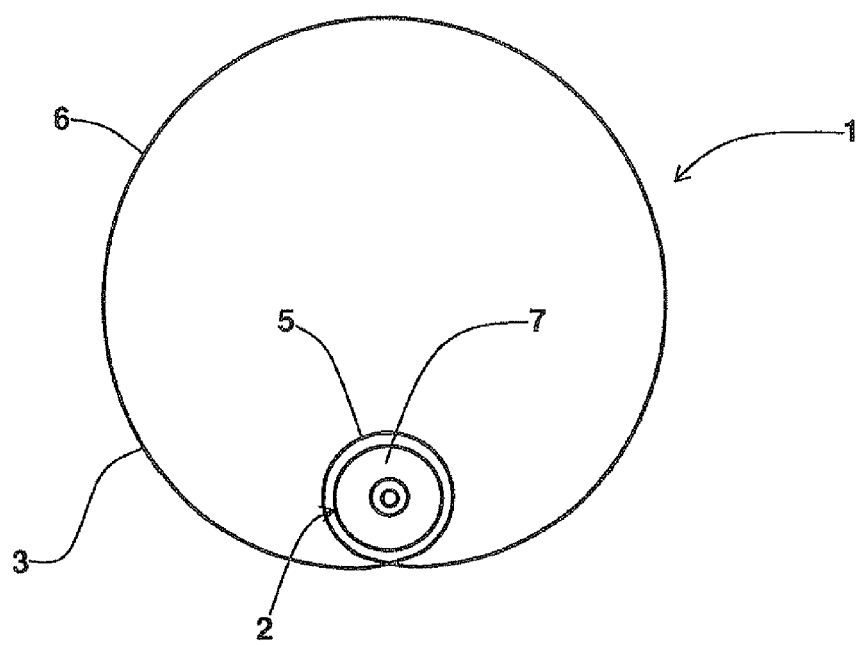
FIG. 5 shows a schematic view in perspective of a sensor system according to a third specific embodiment of the present invention.

FIG. 5 shows a schematic view of a sensor system 1, according to a third specific embodiment of the present invention, the third specific embodiment being illustrated in FIG. 1 identical to the first specific embodiment; only the two subsections 10, 11 of third antenna 6 being connected to each other, so that third antenna 6 includes a loop antenna having one turn; and second antenna 5 also having only one turn.

Figure 6A:
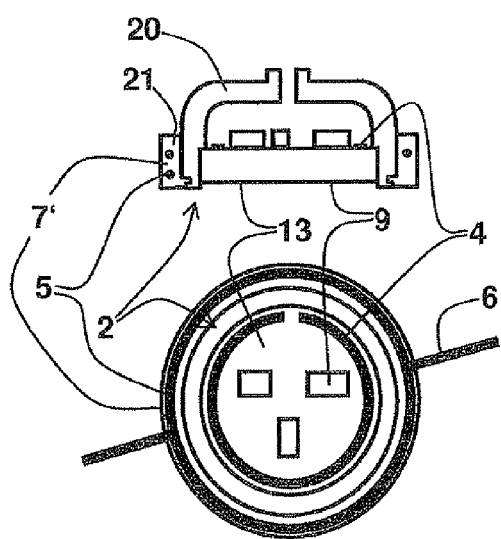
FIG. 6a and FIG. 6b show in each case a schematic top view and a schematic side view of a sensor system according to a fourth and fifth specific embodiment of the present invention.
Figure 6B:
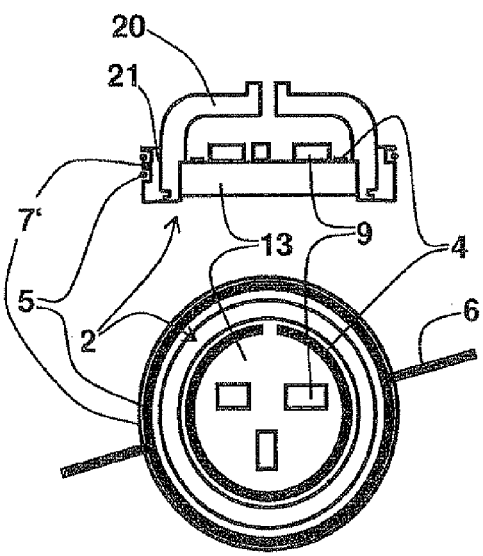

FIGS. 6a and 6b show in each case a schematic top view and a schematic side view of a sensor system according to a fourth and fifth specific embodiment of the present invention, the fourth and fifth specific embodiment being illustrated essentially identically to the first specific embodiment in FIG. 1 and FIG. 2; only in the fourth specific embodiment, shown in FIG. 6a, second antenna 5 being integrated into an additional housing 7'; and only in the fifth specific embodiment, shown in FIG. 6b, second antenna 5 being latched and/or adhered to additional housing 7'. Second housing 7', in particular, has a material-locking, form-locking and/or force-locking connection to module housing 7.

Figure 7A:
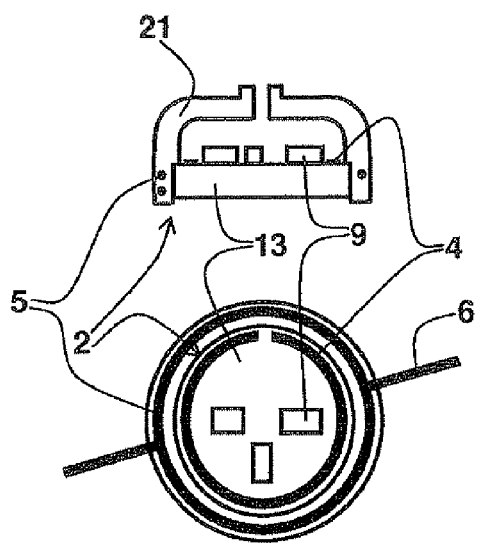
FIG. 7a and FIG. 7b show in each case a schematic top view and a schematic side view of a sensor system according to a sixth and seventh specific embodiment of the present invention.
Figure 7B:
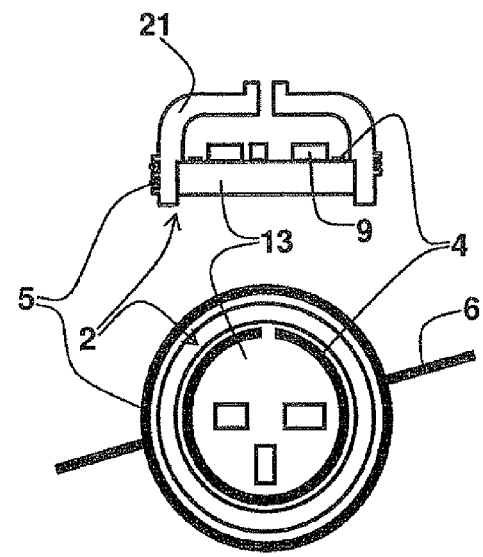

FIGS. 7a and 6b show in each case a schematic top view and a schematic side view of a sensor system according to a sixth and seventh specific embodiment of the present invention, the sixth and seventh specific embodiment being illustrated essentially identically to the first specific embodiment in FIG. 1 and FIG. 2; only in the sixth specific embodiment, shown in FIG. 7a, second antenna 5 being integrated into module housing 7; and only in the seventh specific embodiment, shown in FIG. 7b, second antenna 5 being latched and/or adhered to module housing 7. For this purpose, the module housing particularly has recesses in the vicinity of the second antenna.

Figure 8:
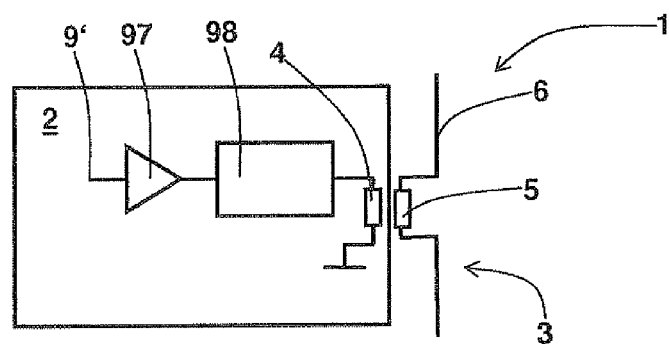
FIG. 8 shows a schematic view of an electrical substitute circuit diagram of the sensor system according to the first specific embodiment of the present invention.

FIG. 8 shows an exemplary schematic view of an electric substitute circuit diagram of sensor system 1, according to the first specific embodiment of the present invention, a component 9 in sensor module 2, particularly a pressure sensor 9', generates a signal which is coupled into first antenna 4. The signal is transmitted inductively to second antenna 5 and coupled into third antenna 6, so that an electromagnetic radiation of the signal takes place. In the same way, a reverse signal path is provided for receiving electromagnetic signals through the third antenna, the received signals being conducted via the inductive coupling from second to first antenna 5, 4 to a component 9 of sensor module 2. The signal of pressure sensor 9' may be amplified before coupling into first antenna 4, in an HF output stage 97, in a matching network 98 that follows HF output stage 97, impedance matching being performed.

Figure 9:
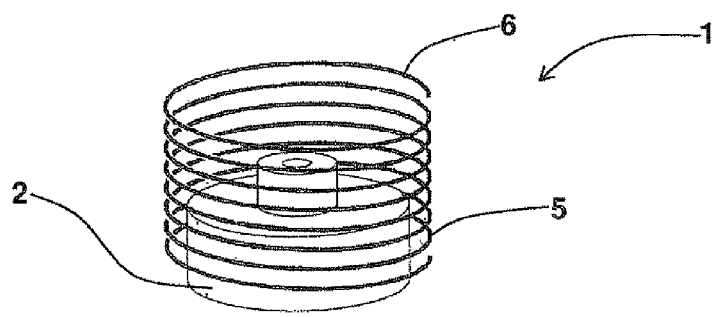
FIG. 9 shows a schematic view in perspective of a sensor system according to an eighth specific embodiment of the present invention.

FIG. 9 shows a schematic view in perspective of a sensor system according to an eighth specific embodiment of the present invention, the eighth specific embodiment being identical to the first specific embodiment illustrated in FIG. 1; and only third antenna 6 being developed as a helix having a plurality of turns.

Figure 10:
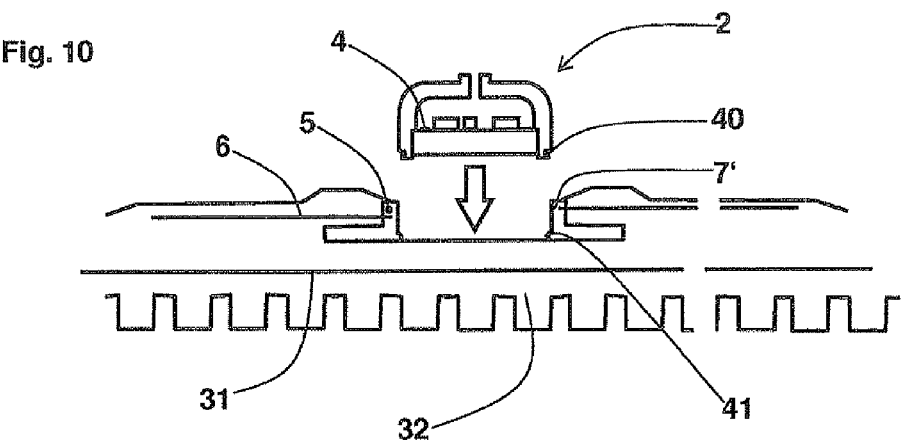
FIG. 10 shows a schematic side view of a sensor system according to a ninth specific embodiment of the present invention, which is integrated into a vehicle tire.

FIG. 10 shows a schematic side view of a sensor system 1 according to a ninth specific embodiment of the present invention, which is integrated into a vehicle tire 32, and the ninth specific embodiment being essentially identical to the fourth specific embodiment illustrated in FIG. 6a; only induction unit 3 being vulcanized into a vehicle tire 32 having a steel belt surface 31. Sensor module 2 is integrated into vehicle tire 32 by being simply pressed into additional housing 7', the latching of a shape 41 in additional housing 7' with a corresponding recess 40 in module housing 7 being provided.

What is claimed is:

1. A sensor system, comprising:
   a sensor module having a first antenna; and
   an induction unit having a second antenna and a third antenna;
   wherein an induction transmission of signals is provided between the first antenna and the second antenna, and wherein the signals are at least one of sent and received electromagnetically by the third antenna.

2. The sensor system of claim 1, wherein the sensor module is enclosed by at least one of a module housing and at least partially by the induction unit.

3. The sensor system of claim 1, wherein the first antenna includes one of a wire loop, a wire strap and a circuit-board conductor loop, on a printed-circuit board.

4. The sensor system of claim 1, wherein at least one of the second antenna and the third antenna include at least one of a wire loop antenna, a helix antenna, a loop antenna and a dipole antenna, wherein the second and the third antenna are in one piece, and wherein at least one of the second antenna and the third antenna have a plurality of turns.

5. The sensor system of claim 1, wherein the sensor module is situated within the second antenna, which is one of a wire loop and a helix.

6. The sensor system of claim 1, wherein the third antenna has two subsections, the second antenna being situated between the two subsections, wherein the subsections are a dipole antenna.

7. The sensor system of claim 1, wherein the induction unit is integrated into a vehicle tire.

8. The sensor system of claim 1, wherein the sensor module has at least one of a passive microelectronic component a micromechanical component, and at least one tire pressure sensor chip, and wherein the components are situated on at least one of the printed-circuit board and an additional printed-circuit board.

9. The sensor system of claim 1, wherein the coupling planes of the first antenna and the second antenna, which are particularly developed as wire loops, are aligned perpendicularly to at least one of the tire tread and a steel belt surface.

10. The sensor system of claim 1, wherein the induction unit is integrated into a vehicle tire by vulcanizing it into the vehicle tire material during a production process of the vehicle tire.

11. A method for operating a sensor system having at least one of a passive microelectronic component and a micromechanical component, the method comprising:
    generating electric signals by at least one of the components;
    inductively transmitting the signals via a first antenna to a second antenna; and
    radiating the signals electromagnetically by a third antenna;
    wherein the sensor system includes:
        a sensor module having the first antenna; and
        an induction unit having the second antenna and the third antenna;
        wherein the signals are inductively transmitted between the first antenna and the second antenna, and wherein the signals are at least one of sent and received electromagnetically by the third antenna, and
        wherein the sensor module has at least one of the passive microelectronic component and the micromechanical component.

12. The method of claim 11, wherein electromagnetic signals are received by the third antenna and are inductively transmitted via the second antenna to the first antenna, and wherein corresponding electric signals are conducted by the first antenna to at least one of the components.

13. A tire pressure control system for use with a vehicle tire, comprising:
    a sensor system, including:
        a sensor module having a first antenna; and
        an induction unit having a second antenna and a third antenna;
        wherein signals are inductively transmitted between the first antenna and the second antenna, and wherein the signals are at least one of sent and received electromagnetically by the third antenna.

* * * * *